United States Patent
Takahashi

(10) Patent No.: US 7,289,043 B2
(45) Date of Patent: Oct. 30, 2007

(54) PORTABLE TERMINAL DEVICE AND CONTROL METHOD OF THE SAME

(75) Inventor: Toshihiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 696 days.

(21) Appl. No.: 10/852,093

(22) Filed: May 25, 2004

(65) Prior Publication Data

US 2004/0239636 A1    Dec. 2, 2004

(30) Foreign Application Priority Data

May 28, 2003    (JP) ............................. 2003-151560

(51) Int. Cl.
*H03M 11/00* (2006.01)
(52) U.S. Cl. ................. 341/22; 345/168; 400/472
(58) Field of Classification Search ................. 341/22, 341/26; 345/168; 400/472; 379/433.07
See application file for complete search history.

(56) References Cited

U.S. PATENT DOCUMENTS 5,424,730 A * 6/1995 Sasaki et al. .................. 341/25

2006/0267805 A1* 11/2006 Glazkova et al. ............. 341/22

FOREIGN PATENT DOCUMENTS

| CN | 1195409 A | 10/1998 |
|---|---|---|
| JP | 7-13666 | 1/1995 |
| JP | 2000-66817 A1 | 3/2000 |

OTHER PUBLICATIONS

Copy of The People's Republic of China Office Action dated Nov. 11, 2005 (and English translation of same).

* cited by examiner

*Primary Examiner*—Timothy Edwards, Jr.
(74) *Attorney, Agent, or Firm*—Dickstein Shapiro LLP

(57) ABSTRACT

A portable telephone has a key operation unit in which a plurality of small keys is arranged close to each other. A user sometimes depresses a plurality of keys at the same time. The portable telephone stores data regarding frequency of key determination made by the user in the past when the plurality of keys was depressed at the same time, with regard to a combination of these keys. When the plurality of keys is depressed at the same time, a key which has been most frequently determined is selected, and a number or the like corresponding to the key is displayed. Further, once the key is determined, data regarding the frequency of determination of the key is updated.

10 Claims, 3 Drawing Sheets

PORTABLE TERMINAL DEVICE AND CONTROL METHOD OF THE SAME

BACKGROUND OF THE INVENTION

1. Field of the Invention

The present invention relates to a portable terminal device having keys and a control method of the same, and particularly to judgment of a depressed key among a plurality of depressed keys.

2. Description of the Related Art

In recent years, small-sized portable telephones have been commonly used. A small-sized portable telephone has many keys arranged in a limited space. These keys are small and arranged close to each other. For this reason, during key operations, a user of a portable telephone often depresses a desired key and other key(s) arranged in the vicinity of the desired key, at the same time.

In a portable telephone which is currently available, when a plurality of keys is simultaneously depressed, the key operation is disabled or the key depressed at the last is enabled.

Japanese Patent Laid-Open Publication No. Showa 58-105329 has disclosed a key selection method in which one of the above methods is selected. However, this method requires a user to depress keys repeatedly. In Japanese Patent Laid-Open Publication No. Heisei 7-13666, when two keys arranged next to each other are depressed at the same time, reference is made to patterns of a string of characters inputted before and after the depression. Based on a result of the reference, one of the keys is selected. However, with this method, a string of numbers such as a telephone number which has no meaning cannot be processed. Japanese Patent Laid-Open Publication No. 2000-66817 has disclosed a touch panel provided with a learning function. A learning unit of the touch panel changes a key input receiving range based on corrected input data. However, this method cannot be applied to a keyboard having keys.

SUMMARY OF THE INVENTION

A portable terminal device of the present invention includes a display unit, a key operation unit, a judgment and storage unit, a key judgment unit, and a device control unit. The judgment storage unit stores frequency of determination of a key which is determined when a plurality of keys is depressed at the same time. The key judgment unit selects a key which is most frequently determined among the plurality of keys depressed at the same time. The device control unit controls display in accordance with a selection made by the key judgment unit.

In a specific example of the present invention, the key judgment unit is capable of storing frequency of determination of a key for each combination of a plurality of keys. When the next key operation for display is performed after display of the key selected by the key judgment unit, the device control unit can update data in the judgment storage unit based on the selection made by the key judgment unit.

A control method of a portable terminal device of the present invention includes the following steps: detecting simultaneous depression of a plurality of input keys; referring to frequency of determination of each key stored for each combination of the plurality of keys; and displaying a key which is most frequently determined. This control method further includes the step of updating the stored frequency of determination when the displayed key is determined.

The present invention is enabled to appropriately judge a key that a user intended to depress, when the user depresses a plurality of keys.

BRIEF DESCRIPTION OF THE DRAWINGS

The above and other objects, features and advantages of the present invention will become apparent from the following detailed description when taken with the accompanying drawings in which:

FIG. 4 shows examples of combinations of keys depressed at the same time.

DETAILED DESCRIPTION OF THE PREFERRED EMBODIMENT

Figure 1:
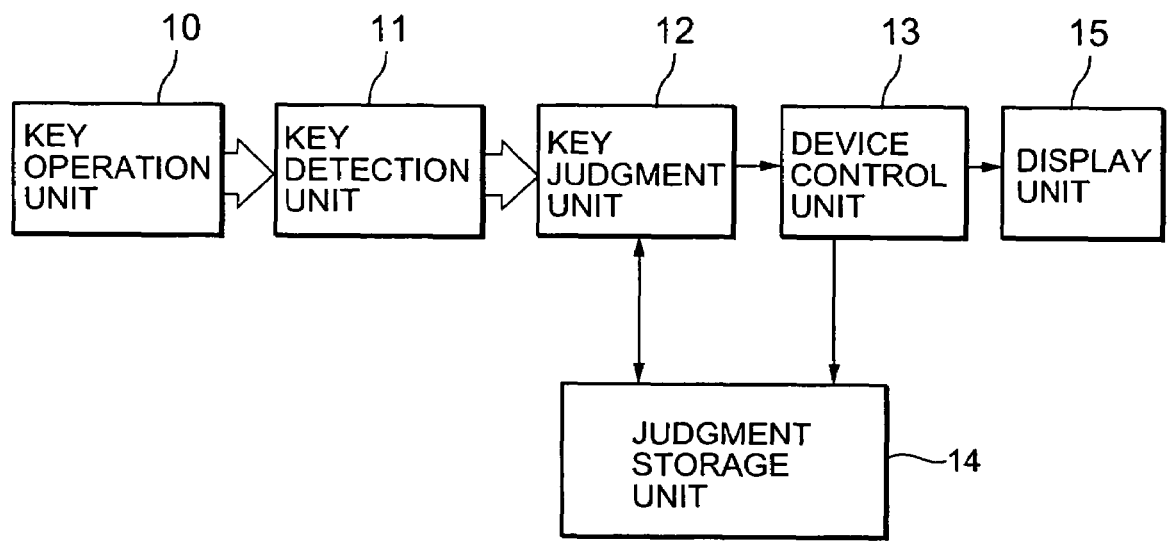
FIG. 1 is a block diagram of a key judgment function unit of a portable telephone of an embodiment of the present invention.

A preferred embodiment of a portable terminal device of the present invention is described below. Referring to FIG. 1, a portable telephone, a specific example of this invention, includes a key operation unit 10, a key detection unit 11, a key judgment unit 12, a judgment storage unit 14, a device control unit 13, and a display unit 15.

Figure 2:
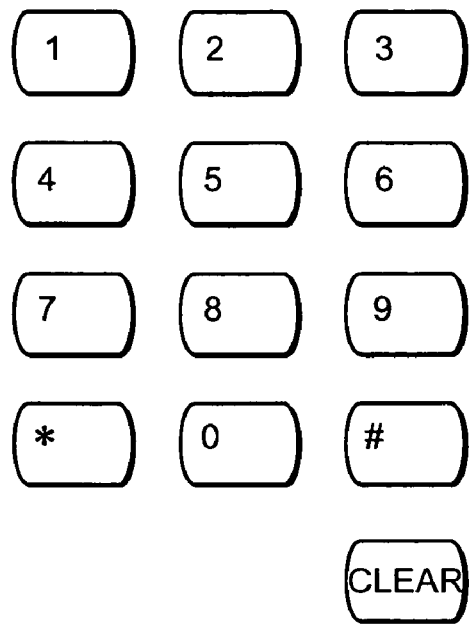
FIG. 2 shows an example of arrangement of keys.

As shown in FIG. 2, the key operation unit 10 has ten number keys, a "*" key, a "#" key, and a clear key for clearing a number or the like displayed on the display unit 15. The key detection unit 11 detects a depressed key. Where a plurality of key buttons is depressed at the same time, the key detection unit 11 detects all depressed keys. When the key detection unit 11 detects a depressed key within, for example, 100 milliseconds after detection of the first key, the key depression unit 11 recognizes that the key is depressed simultaneously with the first key. The duration for judging the simultaneous depression of keys can be changed. The key detection unit 11 transmits key detection information regarding the detected keys to the key judgment unit 12.

Where the key detection information from the key detection unit 11 is related to one key, the key judgment unit 12 transmits the information to the device control unit 13. Where the key detection information is related to two keys or more, the key judgment unit 12 reads frequencies of determination of the keys, which correspond to a key depression pattern (a combination of a plurality of keys which is depressed at the same time) which is the same as that of the depressed keys, from the judgment storage unit 14. The key judgment unit 12 transmits information of a key which is most frequently determined in the above pattern, to the device control unit 13. Where the judgment storage unit 14 does not store any data regarding frequencies of determination of the keys related to the above mentioned key depression pattern, the key judgment unit 12 selects an arbitrary key from the plurality of keys depressed at the same time. For example, the key judgment unit 12 transmits information of the first-detected key to the device control unit 13.

Based on the key input information received from the key judgment unit 12, the device control unit 13 causes the display unit 15 to display a corresponding number or the like. Once a user depresses a plurality of keys at the same time and thereafter determines the key, the device control unit 13 updates information regarding frequency of the determined key for the key depression pattern. When the user successively depresses a key other than the clear key after the number or the like is displayed by the device control unit 13, it is judged that the number or the like displayed is determined.

The judgment storage unit 14 stores frequency of determination of each key for various combinations (patterns) of a plurality of keys which is likely to be depressed at the same time.

Figure 3:
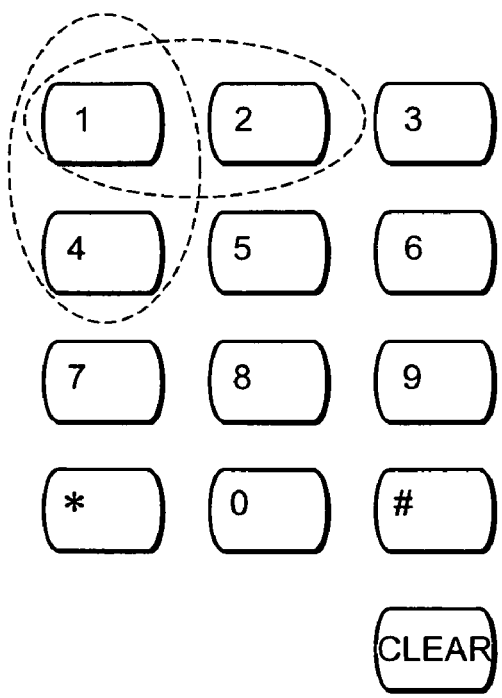
FIG. 3 shows examples of operation of keys.

Hereinbelow, an example of operation of the portable terminal device of this invention is described. Referring to FIG. 3, examples are shown where the keys "1" and "2" are simultaneously depressed and the keys "1" and "4" are simultaneously depressed. As shown in the drawing, while trying to depress the key "1", a user sometimes depresses other key(s) arranged in the vicinity of the key "1." To be more specific, when the user intends to depress the key "1", one of nine depression patterns shown in FIG. 4 may be selected.

For example, where the user depresses the keys "1" and "2" at the same time, the key detection unit 11 transmits key input information of these two keys to the key judgment unit. 12. Meanwhile, the judgment storage unit 14 stores frequency of determination of each key for various key depression patterns as exemplified in FIG. 4. From the judgment storage unit 14, the key judgment unit 12 reads frequencies of determination of the keys "1" and "2", respectively, with regard to the depression pattern of simultaneous depression of these keys. The key judgment unit 12 judges a key which is determined more frequently than the other key, as a depressed key, and transmits the key input information of the key to the device control unit 13. In accordance with the received information, the device control unit 13 causes the display unit 15 to display a number or the like corresponding to the key.

Where the user next depresses a key other than the clear key, the device control unit 13 judges that the aforesaid displayed number or the like meets the user's intention. As a result, the device control unit 13 accesses the judgment storage unit 14 and updates frequency of determination of the key, which corresponds to the aforesaid depression pattern. Where the user determines that the number or the like displayed on the display unit 15 is different from his/her intention, the user usually depresses the clear key and depresses an intended key again. Once the clear key is depressed, the device control unit 13 clears the number or the like displayed on the display unit 15 and does not access the judgment storage unit 14.

For example, where the frequency of determination of the key "1" is seven times and the frequency of determination of the key "2" is three times in the simultaneous depression pattern of the keys "1" and "2", the key judgment unit 12 outputs the key "1" as a judgment result. In accordance with the key judgment result received, the device control unit 13 causes the display unit 15 to display the number "1." Once the user successively depresses a number key (i.e. a key other than the clear key), the device control unit 13 updates data related to the foregoing depression pattern stored in the judgment storage unit 14 so that the frequency of determination of the key "1" becomes eight times. When the user intends to depress the key "2", the user presses the clear key and successively depresses the key "2." When the clear key is depressed, the device control unit 13 clears the number "1" displayed on the display unit 15. When the user is successively depresses the key "2" only, the device control unit 13 updates data within the judgment storage unit 14 so that the frequency of determination of the key "2" becomes four times with respect to the foregoing depression pattern.

In the example described above, the device control unit 13 causes the display unit 15 to display a number or the like in accordance with a key judgment result, in normal display mode. Otherwise, the device control unit 13 may allow a number or the like on the display unit 15 to be displayed in blinking mode or in inverted mode. In this case, a user can easily recognize that the number or the like displayed on the display unit 15 is the number or the like selected from a plurality of depressed keys.

While the present invention has been described in connection with a certain preferred embodiment, it is to be understood that the subject matter encompassed by the present invention is not limited to the specific embodiment. On the contrary, it is intended to include all alternatives, modifications, and equivalents as can be included within the spirit and scope of the following claims.

What is claimed is:

1. A portable terminal device comprising:
    a display unit;
    a key operation unit;
    a judgment storage unit for storing frequency of determination of a key which is determined when a plurality of keys is depressed at the same time;
    a key judgment unit for selecting a key that is determined most frequently among the plurality of keys depressed at the same time; and
    a device control unit for controlling display and updating the frequency, in accordance with a selection made by the key judgment unit.

2. The portable terminal device according to claim 1, wherein the key judgment unit stores frequency of a determined key for each combination of the plurality of keys.

3. The portable terminal device according to claim 1, wherein the key judgment unit selects an arbitrary key among the plurality of depressed keys, when there is no data of the frequency within the judgment storage unit.

4. The portable terminal device according to claim 1, wherein, when a next key operation for display is performed after display of the key selected by the key judgment unit, the device control unit updates data of the frequency based on display of the selected key.

5. The portable terminal device according to claim 1, wherein the key operation unit includes a clear key, and the device control unit clears display of the key selected by the key judgment unit when the clear key is depressed.

6. The portable terminal device according to claim 1, wherein the device control unit includes a function to notify that a selection result of the key judgment unit is displayed.

7. The portable terminal device according to claim 6, wherein the device control unit displays the selection result by the key judgment unit in inverted mode.

8. The portable terminal device according to claim 6, wherein the device control unit displays the selection result by the key judgment unit in blinking mode.

9. A control method of a portable terminal device, comprising the steps of:
    detecting simultaneous depression of a plurality of input keys;
    referring stored frequency of determination of each of the keys for a combination of the plurality of keys; and
    displaying a key which is most frequently determined.

10. The control method according to claim 9, further comprising the step of updating the stored frequency of determination when the displayed key is determined.

* * * * *